US007805508B1

(12) United States Patent
Jones et al.

(10) Patent No.: US 7,805,508 B1
(45) Date of Patent: Sep. 28, 2010

(54) COMMUNICATIONS NETWORK (75) Inventors: Ian Jones, Brighton (GB); Neuv Ngo, Paris (FR)

(73) Assignee: British Telecommunications public limited company, London (GB)

(*) Notice: Subject to any disclaimer, the term of this patent is extended or adjusted under 35 U.S.C. 154(b) by 732 days.

(21) Appl. No.: 09/831,274

(22) PCT Filed: Nov. 17, 1999

(86) PCT No.: PCT/GB99/03834
§ 371 (c)(1),
(2), (4) Date: May 9, 2001

(87) PCT Pub. No.: WO00/35238
PCT Pub. Date: Jun. 15, 2000

(30) Foreign Application Priority Data
Dec. 9, 1998 (EP) .................................. 98310090

(51) Int. Cl.
*G06F 15/173* (2006.01)
*G06F 15/16* (2006.01)
(52) U.S. Cl. ...................................... 709/224; 709/218
(58) Field of Classification Search ................ 370/352; 350/401; 360/466; 709/224, 218
See application file for complete search history.

(56) References Cited

U.S. PATENT DOCUMENTS

| 5,867,495 A * | 2/1999 | Elliott et al. ................. 370/352 |
| 6,138,144 A * | 10/2000 | DeSimone et al. ........... 709/204 |
| 6,285,671 B1 * | 9/2001 | Bossemeyer et al. ......... 370/352 |
| 2001/0046237 A1 * | 11/2001 | Chan et al. ................... 370/419 |

FOREIGN PATENT DOCUMENTS

EP 0818907 A2 7/1997

OTHER PUBLICATIONS

T. Berners-Lee, "Uniform Resource Locators (URL)", Xerox Corporation, M.McCahill University of Minnesota, RFC1738.*
RFC 1738 "Uniform Resource Locator" by T-Berners-Lee, 1994, M.McCahill.*
Bonjour et al, "Internet appplication over native ATM" 1998, Computer Networks and ISDN Systems, p. 1097-1110.*
HF Zhu, "DNS and URL Level Addressing for Public Circuit Switching Network Devices", Oct. 1997, pp. 1-4.*
HF Zhu, "Framework for Interconnecting Internet with Public Circuit-Switching-Network", Nov. 1997.*
Almesberger et al, "Guaranteeing Quality of Service for the Web Using ATM" Data Highway, Jan. 1, 1995, pp. A21/1-A21, XP000570052.
Ott et al, "Prototype ATM LAN System Multimedia on Demand Applications", NEC Research and Development, vol. 35, No. 4, Oct. 1, 1994, pp. 366-373, XP000496856.
Bonjour et al, "Internet Applications Over Native ATM", Computer Networks and ISDN Systems, vol. 30, No. 12, Jul. 13, 1998, pp. 1097-1110, XP004129612.
Katsube et al, "Internetworking Architecture Based on Routers With Cell Switching Capability", ISS '97, World Telecommunications Congress. (International Switching Symposium), Global Network Evolution: Convergence or Collision? Toronto, Sept. 21-26, 1997, vol. 1, Sep. 21, 1997, pp. 89-95, XP000720511.

* cited by examiner

*Primary Examiner*—Karen C Tang
(74) *Attorney, Agent, or Firm*—Nixon & Vanderhye, PC (57) ABSTRACT

A Uniform Resource Locator (URL) includes an identifier part that identifies the URL as being for a resource on a circuit-switched network, a service parameter part and an address part. A terminal reads on the URL and establishes a connection to the resource. Properties of the connection, such as the bandwidth or the connection topology, are determined by values of service parameters in the service parameter part.

20 Claims, 4 Drawing Sheets

COMMUNICATIONS NETWORK

BACKGROUND TO THE INVENTION

1. Field of the Invention

The present invention relates to a communications network and in particular to a circuit-switched network such as an ATM (Asynchronous Transfer Mode) network.

2. Related Art

Conventionally, networks using packet-based protocols such as Internet Protocol (IP) have functioned on a best effort basis. As a result, quality of service, as measured by such parameters as packet loss and latency, has varied considerably depending on the loading of network resources such as routers. While such variation is acceptable for some applications, such as Email, it is potentially a barrier to the use of Internet Protocol for more critical applications such as voice telephony or multimedia conferencing. Accordingly, considerable effort has been directed to providing improved Quality of Service (QoS). One approach has been to supplement IP with QoS-related protocols such as ReSource reserVation Protocol (RSVP). Another approach has been to make use of circuit-switched networks, and particularly ATM networks to carry IP traffic. When a customer terminal and a data source are both connected to an ATM network, then a Switched Virtual Circuit (SVC) may be used to "cut-through" from the terminal to the source, bypassing any intermediate routers, and providing a uniform and predictable QoS level. However, establishing a switched virtual circuit is a complex operation requiring the setting of a number of service parameters and this presents a barrier to the widespread adoption of this technique, despite its advantages.

The paper by W Almesberger et al, "Guaranteeing Quality of Service for the Web using ATM", Data Highway, 1 Jan. 1995, pages A21/1-A21/16 describes an attempt to automate the process of establishing connections over an ATM network. The information required to establish the connection is split between the user agent field defined in the HTTP (hypertext transport protocol) and metadata encoded with the HTTP document. This complex approach requires two ATM connections to be established, and several signalling messages to be exchanged. Such a signalling overhead is undesirable since it increases the time required to switch to the ATM network, and hence reduces the transparency of the change between networks to the user. It also places additional demands on the network resources.

SUMMARY OF THE INVENTION

According to a first aspect of the present invention, there is provided a digital signal encoded with a Uniform Resource Locator (URL), the uniform resource locator comprising an identifier part identifying a resource as being accessible via a circuit-switched network, an address part comprising the address of the resource, and a service parameter part.

URL's, as their name suggests, provide a standard system for identifying the location of resources on a network such as the Internet. They are commonly in the form <scheme>:<scheme-dependent-information>, where scheme identifies the type of resource and may be, for example, http, or ftp and the scheme dependent information is conventionally a network address and a file path. The present invention by providing a URL scheme that is specific to resources on a circuit-switched network, and by including in the URL not only address information but also service parameters, makes it possible to set up circuits in a circuit-switched network with far greater ease than has been possible hitherto. The invention is particularly advantageous in the context of an ATM network, but might also be applied to other types of networks, such as, for example, a frame-relay network.

According to a second aspect of the present invention, there is provided a method of operating a terminal connected directly or indirectly to a circuit-switched network, the method including:

a) reading a URL comprising a circuit-switched identifier part identifying a resource as being accessible via a circuit-switched network, an address part comprising the address of the resource, and a service parameter part b) subsequently establishing a connection between the customer terminal and the resource, the connection having properties determined at least in part by one or more parameters contained in the service parameter part.

Preferably the method includes reading the URL from a server remote from the terminal. Although the URL may be read from a local source, such as a browser bookmark file, the present invention is particularly advantageous when used with URL's which are supplied to the terminal from a remote server. The server, unlike the terminal, will generally have details of the nature of the resource in question and is therefore able to set the service parameters accordingly. For example, if the resource is a high quality video data stream needing a high bandwidth connection then the server may set correspondingly high service parameters in the URL.

Preferably step (b) is initiated by the terminal.

The invention also encompasses a signal carrier carrying a signal in accordance with the first aspect of the invention, and customer terminals and network servers arranged to use the URL's of the invention.

DESCRIPTION OF DRAWINGS

Systems embodying the invention will now be described in further detail, by way of example only with reference to the accompanying drawings, in which.

DESCRIPTION OF EXAMPLES

Figure 1:
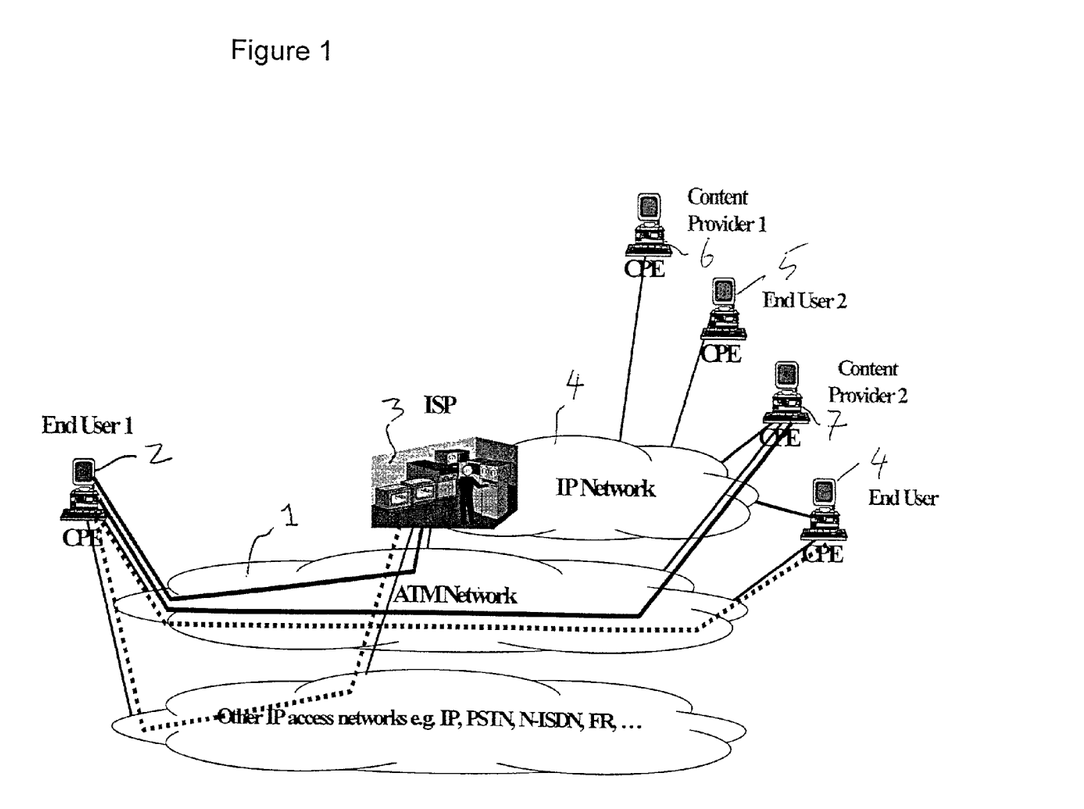
FIG. 1 shows a network embodying the invention.

As shown in FIG. 1, a communications system includes an ATM network 1. A customer terminal 2 is connected via the ATM network to an Internet Service Provider (ISP) 3 and to the public Internet. Via the Internet the customer terminal can connect to other end user customer terminals 4, 5 and to content provider data servers 6,7. One of the data servers 6,7 is also connected to the ATM network 1.

In use, the customer terminal 1 runs a client application that, in this example, is a web browser. The web browser is modified to support Windows Socket v2 (WinSock2) functionality, enabling ATM SVC's to be established and released in addition to TCP/IP or UDP/IP flows. In a conventional fashion, the web browser reads a web page served, for example by the data server 7. This web page includes links to resources stored on the data server. These links may include, for example, URL's for a number of MPEG-encoded video files. These URL's use an implementation of the ATM URL scheme of the present invention. The format of the ATM URL is described in further detail below. The URL contains the ATM network address of the server and the path on the server for the corresponding file, together with ATM service parameters. When the user of the customer terminal 1 clicks on one of these links, the URL is returned by the server to the web browser on the customer terminal. The customer terminal reads the ATM address and the service parameters from the URL, and then outputs signals into the ATM network in order to set up a switched virtual circuit to the specified address. Some of the service parameters may be marked in the URL as being user-defined. In this case, the web browser displays a window (also termed the "ATM GUI") that indicates to the user options for the user-defined settings. The user enters values in boxes in the window, or accepts default settings, and these values are added to the service parameters already defined in the URL.

It should be noted that the HTTP server and the ATM server can reside on the same, or on physically separated computers.

The general format of a URL is defined in the IETF (Internet Engineering Task Force) publication RFC (Request For Comments) 1738. URL's are defined as a sub-part of Universal Resource Identifiers, which are defined in IETF publication RFC1630. The format of a URL as defined in RFC1738 is:

<scheme>:<scheme-dependent-information>.

An URL contains the name of the scheme being used (<scheme>) followed by a colon and then a string (the <scheme-dependent-information>) whose interpretation depends on the scheme. Schemes that are currently widely used today on the Internet include, "http", "gopher", "ftp", and "news" etc. The purpose of these schemes is to inform the end user and/or the application of what type of resource is trying to be accessed and/or what mechanism shall be used to obtain that resource. The format of each of the scheme dependent information is reliant on the type of scheme used. For example, the scheme dependent information for HTTP is different from that used by FTP. However, most schemes do consist of the following information:

the name and domain of the server where the file resides, plus the "location or path" to the file.

Therefore many URLs for HTTP, FTP and Gopher resources are expressed as, scheme://server.domain/full-path-of-file where the scheme is separated from the Internet address of the server by two forward slashes (//) and the Internet address is separated from the full path to the file with a single forward slash (/).

This embodiment of the present invention uses a new URL scheme, termed the ATM URL. In the syntax of this scheme, URL's for resources on an ATM network are identified by the string atm://. The scheme-dependent information in this case is of a different type to that used in conventional URL schemes such as those identified above. The scheme dependent information is divided into two segments. The division between the two segments is marked by a separator character. In this embodiment, the separator character is "@", although the scheme might alternatively be implemented using other separator characters. An ATM URL has the following format:

atm:// ATM parameters @Server ATM address.sub-address/full-path-of-file The first segment is where the ATM parameters are located. The second segment contains the ATM server address. The ATM parameters and the ATM server address are separated by the '@' character. The format of the file path remains unchanged and is separated from the ATM server address by a single forward slash. The ATM server address can be specified in a number of ways:

Native E.164 addressing scheme, as defined in ITU-T Recommendation E164 (May 1997)

An ATM End System Addressing (AESA) scheme

A name-based address.

When a name-based address is used, then the client application uses a domain name server to resolve the name into a corresponding network address.

The use of sub addressing for either E.164 or AESA addressing scheme is optional in the URL. This is achieved by separating the ATM server address and the sub-address by the '.' character, thereby extending the length of the ATM server address field. This ATM format still enables search strings to be carried out, such as by appending a '?' character to the end of the file path.

Table 2 below identifies the ATM parameters which are specified within the server.domain section of the ATM URL. The ATM parameters are coded from left to right. These ATM parameters represent the main Information Elements (IEs) specified in the ATM-F UNIv3.0, UNIv3.1, UNI v4.0, UNI v4.1 and ITU-T Q.2931 signalling protocols. As shown in Table 2, the length of certain ATM parameter fields can vary. Therefore, to ensure that the web browser can reliably decode the information within the URL, each parameter is separated from another by a key character. In this embodiment the '.' character is used to delimit the different ATM parameters within the URL. It should be recognised that the '.' character is not the only key character which could be used. Other key characters such as '@', '?', '#', ':', '/' or '\' could be used. RFC 1783 contains more information on using key characters.

Only one instance of each field is defined in the ATM URL, i.e. the fields are not repeated. This is due to the fact that the corresponding information can only be present once in the ATM signalling SETUP or LEAF SETUP REQUEST message.

The WinSock2 SPI is responsible for coding the ATM information into the correct format to be used by the underlying ATM signalling protocol. More information regarding the WinSock2 Specification is given in WinSock 2.0 Specification, May 1996, version 2.2.0. The WinSock2 SPI is responsible for adding the additional mandatory ATM IEs, which are not present in the ATM URL, but are required by the underlying ATM signalling protocol.

The underlying signalling protocols are responsible for any interworking between different signalling systems protocols. It is the responsibility of the signalling protocol and not the application (i.e. web browser) to verify that the user selected functionality can be supported by the network.

The abbreviations used in Table 2 are listed in the glossary below.

The functionality and coding of the ATM parameters shown in Table 2 will now be described.

UNI Protocol Version Field

A number of different ATM UNI signalling protocols may be supported by the ATM server, and by the web browser. The ATM URL has a field describing what protocol or protocols are supported by the ATM server. This technique results in fewer interworking problems, and more successful call establishment attempts, between the web browser and the ATM server(s).

Connection Topology Field

Three different connection topologies are identified, as defined in UNIv3.1 and UNI4.0/4.1. These include point-to-point, point-to-multipoint and Leaf Initiated Join (LIJ). If the server has indicated one of these connection topologies, then the user is not able to change it within the ATM GUI. If however, this field is coded as 'User defined' then the user can select any topology provided it is supported by the protocol.

UNIv4.0 (ATM FORUM af-sig-0061.000) defines two types of LIJ connections. These are known as Network LIJ connections and Root LIJ connections. In the present example, only the Network LIJ connections shall be supported.

As defined in UNIv4.0, in the context of an LIJ connection, it is the network that selects the ATM parameters such as, bandwidth QoS, traffic types etc. and not the Leaf, (i.e. the web browser). If the ATM URL is coded as a LIJ connection, then only some of the ATM parameters are required by the web browser. These ATM parameters includes, LIJ Call Identifier;

ATM server address information (i.e. the Called Party Number);

ATM address of the web browser (i.e. the Calling Party Number).

Like the Call Reference value, the LIJ Leaf Sequence Number value is internally generated by the web browser's signalling protocol stack and therefore does not need to be transferred within the ATM URL.

LIJ Call Identifier Field

The LIJ Call Identifier, is used with the called party number to uniquely identify a LIJ call at the root interface. As defined in UNIv4.0, the LIJ Call Identifier value shall be expressed as an 32-bit integer. Therefore valid values of the LIJ Call Identifier, range from 0-4294967296 (i.e. $0-2^{32}$).

AAL Type Field

Above the ATM layer there are a number of ATM Adaptation Layers, supporting different functionality that can be used. This example allows the following AAL types to be coded in the ATM URL:—

AAL Type 1 as defined in ITU-T Recommendation I.363.1;

AAL Type 2 as defined in ITU-T Recommendation I.363.2;

AAL Type 3/4 as defined in ITU-T Recommendation I.363.3;

AAL Type 5 as defined in ITU-T Recommendation I.363.5;

The WinSock2 SPI will add additional AAL information to the AAL IE, such as forward and backward maximum CPC-S_SDU size, MID range and SSCS type etc. The UNIv4.0 specification and ITU-T Q.2931 recommendation define a list of AAL parameters that are used for signalling between two peer entities.

Bearer Capability Field

With ATM connections there are a number of different bearer capabilities, which can be used depending on the type of service being supported. This example allows the following bearer capabilities to be coded in the ATM URL:—

Bearer Class BCOB-A;

Bearer Class BCOB-C;

Bearer Class BCOB-X;

Virtual Path (VP) service

Service Category Field

ATM allows a number of ATM Transfer Capabilities (ATC) or Service Categories to be specified. Table 1 below shows the different ATC or service categories supported by the ATM-F and the ITU-T.

| ITU-T I.371 ATM Transfer Capability | ATM Forum TM 4.0 ATM Service Category |
|---|---|
| Deterministic Bit Rate (DBR) | Constant Bit Rate (CBR) |
| See below | Real Time Variable Bit Rate (rt-VBR) |
| Statistical Bit Rate (SBR) | Non-Real Time VBR (nrt-VBR) |
| Available Bit Rate (ABR) | Available Bit Rate (ABR) |
| See below | Unspecified Bit Rate (UBR) |
| ATM Block Transfer (ABT) | (no equivalent) |

VBR-rt is equivalent to ITU-T SBR with QoS class 1.

ITU-T Q.2961.1 Annex A allows as an option the support of UBR.

Table 1 ATCs or Service Categories Supported by the ITU-T and ATM-F

Different ATCs or Service Categories are defined by various traffic parameters. For example CBR and UBR conformance definitions are defined by just the Peak Bandwidth, whereas VBR is defined by the Peak and Sustainable bandwidth, plus the Maximum Burst Size (MBS).

Fwd & Bwd Peak & Sustainable Bandwidth Plus MBS Fields

The Peak and Sustainable bandwidth values (for both forward and backward directions) can either be set to 'User Defined' or Server Defined'. If they are coded as user defined then it is the responsibility of the end user to enter their desired values. If the web browser detects that a field is coded as 'User Defined' it shall invoke the ATM GUI enabling the user to enter the appropriate values. If however the forward or backward bandwidth values are coded as 'Server Defined' then the server has already chosen values for the appropriate forward and backward bandwidth fields. It is possible to code the forward Peak/Sustainable bandwidth value as 'User Defined' but the backward Peak/Sustainable bandwidth value as 'Server Defined' and vice versa. The same principles apply to the forward and backward MBS.

Fwd & Bwd QoS Fields

The forward and backward QoS can either be chosen by the server or by the user. If coded as 'User Defined' then the user shall via the ATM GUI select which QoS values are appropriate, otherwise the QoS values are selected by the server. The QoS classes are the same as defined in ATM-F UNIv3.1 therefore, Class 1 represents the highest quality, whilst, 4 is the lowest quality. Class 0 represents 'Unspecified' QoS and is used in conjunction with UBR. It is possible to code the forward bandwidth value as 'User Defined' but the backward bandwidth value as 'Server Defined' and vice versa.

All the ATM signalling protocols supported in this patent allow QoS classes to be signalled. However UNIv4.0/4.1 also allows, as an option for individual QoS parameters values to be signalled. Therefore within the QoS field of the ATM URL, the support of individual QoS parameters can be specified. It is however, the responsibility of the end user or application to supply the values for the individual QoS parameters. More information regarding the signalling of individual QoS parameters is given in the UNIv4.0 specification.

Tagging Field

The tagging of ATM cells is a functionality supported by both the ATM-F UNIv4.0 and also ITU-T Recommendation Q.2961.6. The tagging of ATM cells, means lowering the priority of cells from CLP=0 to CLP=1 when they are deemed to be in breach of their traffic contract. It should be noted that ATM-F UNIv4.0 and ITU-T Q.2961.6 differ in their approach to tagging. ATM-F UNIv4.0 signalling protocol supports local tagging and uses octet 17 of the Broadband Bearer Capability (B-BC) IE to denote whether forward or backward tagging is applicable. ITU-T Q.2961.6 does not use octet 17 of the B-BC IE, but, defines two additional Broadband Transfer Capability code-points, in (octet 5a) of the B-BC IE to support global tagging. The WinSock 2 SPI codes the signalling message to support tagging depending on which signalling protocol is supported.

Negotiation Field

The negotiation of ATM traffic parameters is a signalling functionality supported by both ATM-F UNIv4.0 and also ITU-T Recommendation Q.2962. The ATM signalling negotiation allows for either an Alternative ATM traffic descriptor value or a Minimum Acceptable ATM traffic descriptor to be specified. It should be noted that both values can not be specified simultaneously. The user may choose the values for the Alternative or Minimum Acceptable ATM traffic descriptors manually via the ATM GUI, or this may be done automatically by the application.

Modification Field

ITU-T Recommendations Q.2963.1 and Q.2963.2 allow the forward and backward ATM traffic descriptor values (i.e. the cell rates) to be modified during the active part of the call. This functionality is only available in ITU-T signalling protocols and not in the ATM-F signalling protocols. Q.2963.1 is intended to be used for only CBR type connections whereas Q.2963.2 is intended to be used for VBR type connections. In order for the web browser to know whether the modification functionality is supported by the ATM server this information needs to be coded in the ATM URL. As the web browser can determine the service category from the ATM URL, only one value is required for the modification field. The user may manually invoke this modification process to either increase or decrease the cell rate, via the use of the ATM GUI or this may be done automatically via the application which is using the ATM SVC. If the user manually invokes the modification procedures, then the appropriate functionality would need to be supported in the ATM GUI.

In relation to the parameters listed in Table 2, it should be noted that the value for the Peak and/or Sustainable Cell Rate and Maximum Burst Size are dependent upon the limitations of the physical layer and the capabilities of the ATM switch(es) used for the SVC. If any of the functionality listed in the table is not supported by the ATM server, then, this is indicated by the character 'x'. Unlike the underlying signalling information elements (IE's), the parameters listed in the table are position dependent, as they have no proceeding identifier. The Calling Party Number, is not shown in the Table. The ATM server address will be mapped into the Called Party Number IE by the WinSock2 Service Provider Interface (SPI).

ABR information fields carried in the ABR Setup Parameters IE, are only optional in the user to network direction, as defined in UNIv4.0. Therefore this information carried in the ABR Setup Parameters is not defined within the ATM URL. This does not preclude the calling party to include the ABR Setup Parameters IE in a SETUP message.

ABR information, which is carried in the ABR Additional Parameters IE, is only optional in the user to network direction when the user wants to specify explicitly a set of ABR additional parameters as defined by UNIv4. Therefore this information carried in the ABR Additional Parameters IE is not defined within the ATM URL. This does not preclude the calling party including the ABR Additional Parameters IE in a SETUP message. The allowable combination of traffic parameters, QoS and bearer capabilities shall be in accordance with the UNIv4.1 specification The negotiation of the ABR parameters is possible in this implementation, provided that the negotiation field within the ATM URL is coded accordingly. UNIv4.1 and ITU-T Q.2961.3 define which ABR parameters can be negotiated.

As no Conformance Definition currently makes use of the PCR (CLP=0) category, then this is not supported in the coding of the ATM URL.

An example of an ATM URL coded in accordance with Table 2 is as follows:

atm://1.1.x.5.2.2.1.500.x.x.375.x.32.

qj250.x.x.187.x.64.1.1.x.x.x@
470102030405060708090a0b0c0d0e0f01020304/public/video.mpg The characteristics of a corresponding ATM SVC (switched virtual circuit) are as follows:
Server supports ATM-F UNIv3.1;
Connection Topology type is point-to-point;
LIJ Call Identifier value is not supported, as point-to-point connection required;
AAL type is of type5;
Bearer Capability is of BCOB-X;
VBR service category selected by server;
Forward Peak bandwidth (CLP=0+1) value defined by the server;
Forward Peak bandwidth (CLP=0+1) value is 500 Kbits/s;
Forward Minimum Bandwidth not used, (i.e. No ABR as VBR selected);
Forward Sustainable bandwidth (CLP=0+1) is not used;
Forward Sustainable bandwidth (CLP=0) value defined by the server is 375 Kbits/s;
Forward MBS (CLP=0+1) is not used;
Forward MBS (CLP=0) value defined by the server is 32;
Backward Peak bandwidth (CLP=0+1) value defined by the server;
Backward Peak bandwidth (CLP=0+1) value is 250 Kbits/s;
Backward Minimum Bandwidth not used, (i.e. No ABR as VBR selected);
Backward Sustainable bandwidth (CLP=0+1) is not used;
Backward Sustainable bandwidth (CLP=0) value defined by the server is 187 Kbits/s;
Backward MBS (CLP=0+1) is not used;
Backward MBS (CLP=0) value defined by the server is 64;
Forward QoS class defined by the server is class 1;
Backward QoS class defined by the server is class 1;
Tagging is not supported;
Negotiation is not supported;
Modification is not supported;

The server address is specified in the AESA scheme, with the following value:
470102030405060708090a0b0c0d0e0f01020304

The path and name of the file is public/video.mpg.

Figure 2:
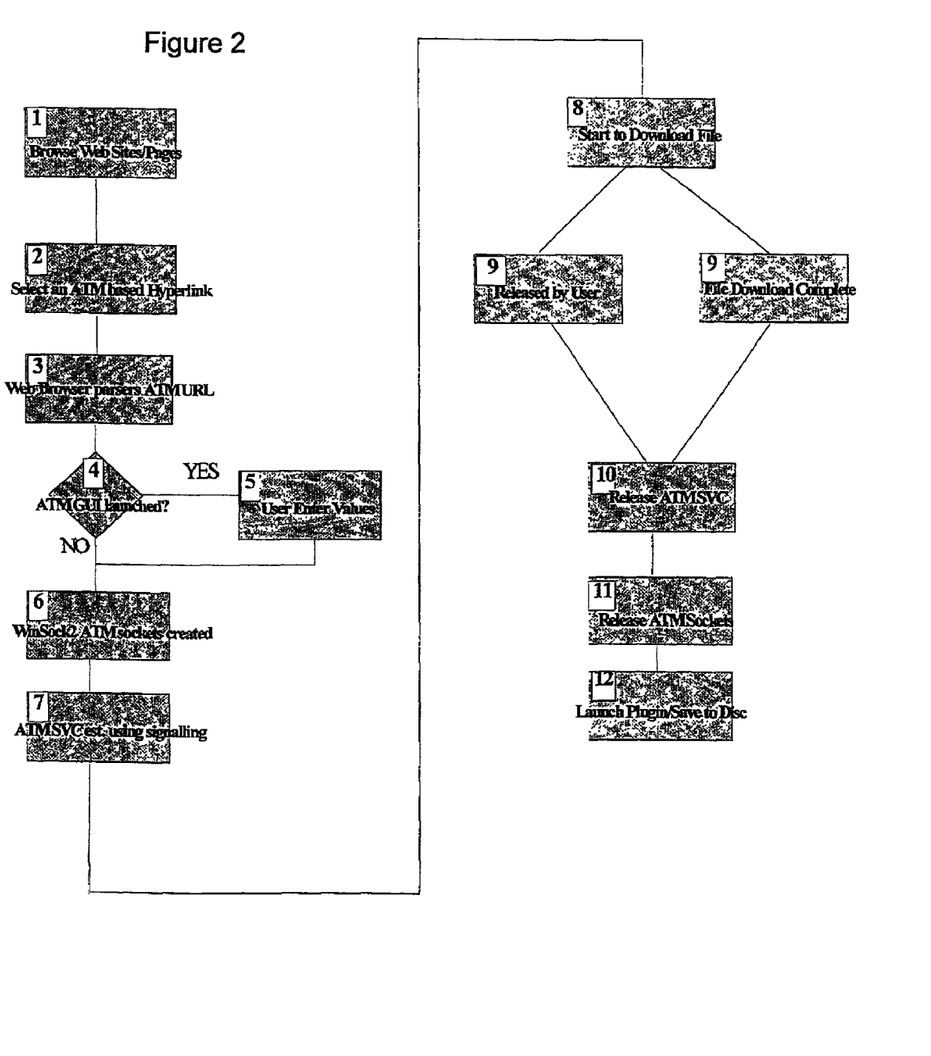
FIG. 2 is a flow diagram.

FIG. 2 is a flow diagram illustrating in further detail the behaviour of a system operating using ATM URL's. The steps shown are as follows:
1. The user searches web pages for the relevant information, as if using a standard web browser. No ATM SVC has been established.
2. When the user clicks on the desired ATM Hyperlink/URL, or uses a bookmark, the web browser performs the following operations:—

3. First the Web browser has to determine that this is an ATM URL request, if so, it has to parse/decode the ATM information. This information is stored and used to help construct the profile of the signalling message capability, plus determine the socket and protocol state machine type. It should be noted that the ATM URL does not contain all the ATM IE's defined in the signalling protocols supported by this patent. This is due to two reasons. Firstly, not all the defined IE's are sent in the ATM signalling SETUP or LEAF SETUP REQUEST messages. Secondly, the ATM information within the URL contains only the information required by the web browser. The web browser or the WinSock2 API is free to add valid additional ATM information before initiating the ATM SVC. An example of this additional ATM information could be the Calling Party Number, Calling Party Sub-address, Transit Network Selector (TNS) Broadband Sending Complete, Broadband Repeat Indicator, Broadband High and Low Layer Information, Narrowband High and Low Layer Compatibility etc. Before data can be sent between the two entities, the web browser has to use the correct protocol state machine implementation for the URL scheme. The ATM protocol state machine has to be also associated with the ATM socket descriptor. As the URL scheme is 'atm://' the web browser knows it should use the ATM protocol state machine and create ATM sockets. The state machine is used by the web browser to define its behaviour when sending and receiving data over a connection. This state machine has been developed for use with ATM connections. The ATM state machine is described in further detail below with reference to FIG. 4.

4. If however, the web browser client determines after decoding the ATM URL that no ATM parameter value(s) need to be specified manually by the Web browser then, the ATM GUI is not launched and the Web browser uses the underlying WinSock2 Application Programming Interface (API) functionality to establish an ATM SVC to the desired destination. The characteristics of this ATM SVC will be the same as those values returned from the HTTP server in the ATM URL. This corresponds to state ATM_GET_SETTINGS in FIG. 4.

5. If the user is required to define a particular ATM parameter value(s), the web browser launches the ATM GUI shown in FIG. 3. This ATM GUI is an extension to traditional web browser applications, in that it allows the end users to enter values for the ATM parameters coded as 'User Defined' within the ATM URL. The values entered by the end user via the ATM GUI are also stored to help build the profile or characteristics of the signalling messages, which will be sent to the ATM server(s). This corresponds to state ATM_GET SETTINGS in FIG. 4.

Figure 4:
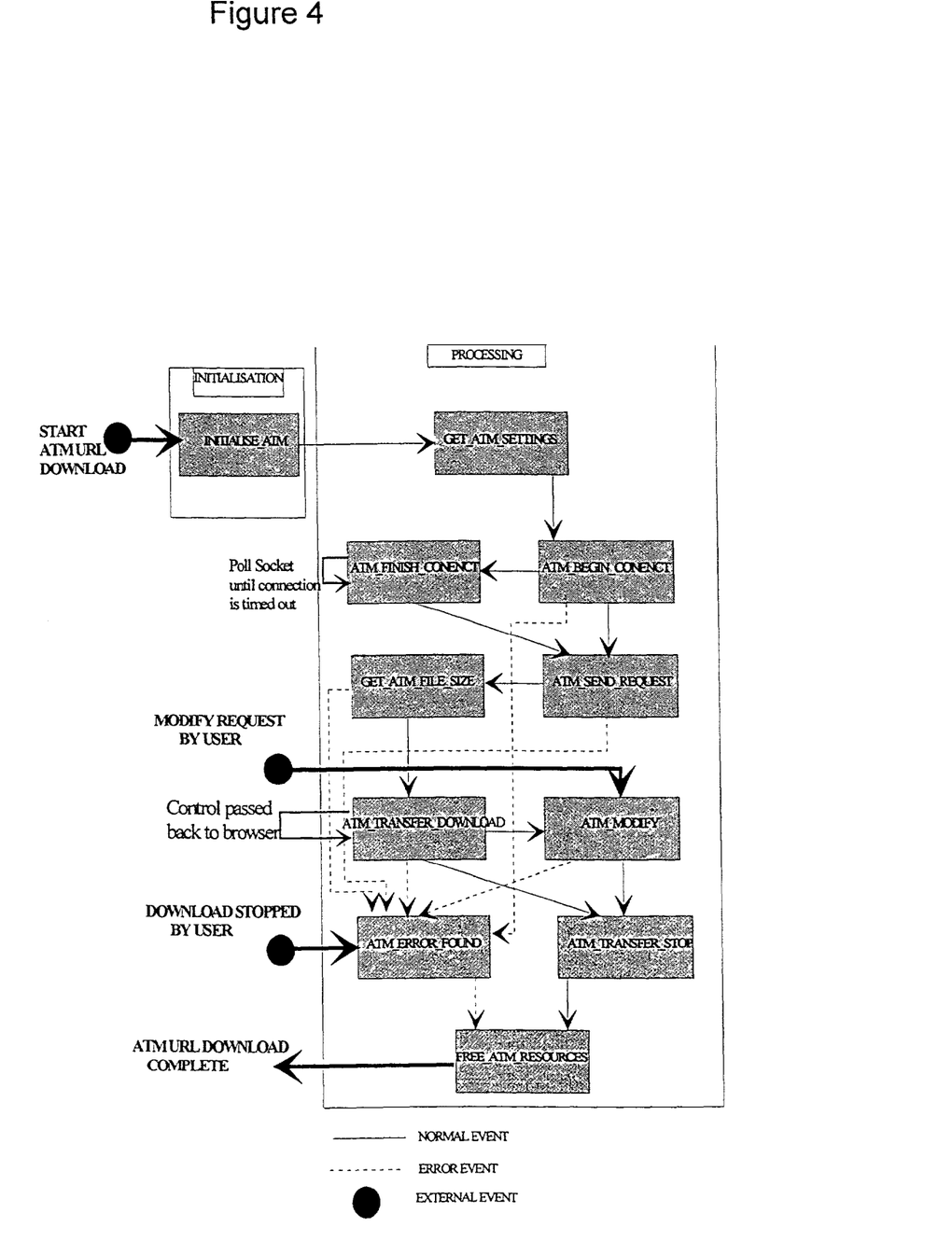
FIG. 4 shows a state machine for a client application implementing the invention.

6. WinSock2 is responsible for creating ATM sockets for the web browser and ATM server to communicate via. This involves the web browser and ATM server to invoke a number of WinSock2 function calls. When the ATM sockets have been created but not connected together, then this corresponds to state ATM_BEGIN_CONNECT, as shown in FIG. 4.

7. Once the server and client ATM sockets are created, WinSock2, communicates with the underlying signalling protocol stack to establish an ATM SVC and logically connects the two ATM sockets together. The WinSock2 SPI is responsible for taking the ATM URL parameters, plus possible information added by the user and coding them into the correct format to be used with the underlying signalling protocol, be it UNIv3.0, UNIv3.1, UNIv4.0, UNIv4.1 or Q.2931. The WinSock2 SPI is also responsible for including mandatory Signalling IE's, not defined in the ATM URL. Examples of these mandatory IE's include, the Protocol Discriminator, Call Reference, Message Length, Message Type and Endpoint Reference (for Point-to-Multipoint connections) plus LIJ Sequence Number (for LIJ connections). If the ATM SVC is successfully established then, charging records for that connection can be generated and state ATM SEND_REQUEST is entered, see FIG. 4. If however, the SVC fails to be established, the web browser launches a window to inform the user of the event and enters the ATM_ERROR_FOUND state.

8. Once the ATM SVC is established, data can be sent and received between the web browser and the ATM server. Before the file(s) are downloaded the ATM server returns the total length of the file to be downloaded to the web browser. The number of bytes of data received by the web browser is incremented and compared with the file size obtained at the GET_FILE_SIZE state, of FIG. 4. If the two values are equal, then the whole file has been transferred and the ATM_TRANSFER_STOP state is entered, else the transfer continues. When downloading data, control is passed back from the state machine to the calling application, so it won't block user commands. Knowing the size of the file, allows the web browser to display the transfer progress status (indicating the proportion of bytes received compared to the total number yet to be received) and to estimate the remaining time of the transfer. As many different types of data can be downloaded, the web browser has to know how to interpret each type of data. Depending on the associated Multipurpose Internet Mail Extensions (MIME) type, the data is directed to either a plug-in application, a file name on a local or remote disc, or to the web browser display.

9. If errors occur during the download process, the state machine enters the ATM_ERROR_DONE state. This may occur for several reasons, such as, the ATM server did not send the size of the file in the first packet; or the transfer of a buffer cannot be completed because either there was a network or application failure etc.

Figure 3:
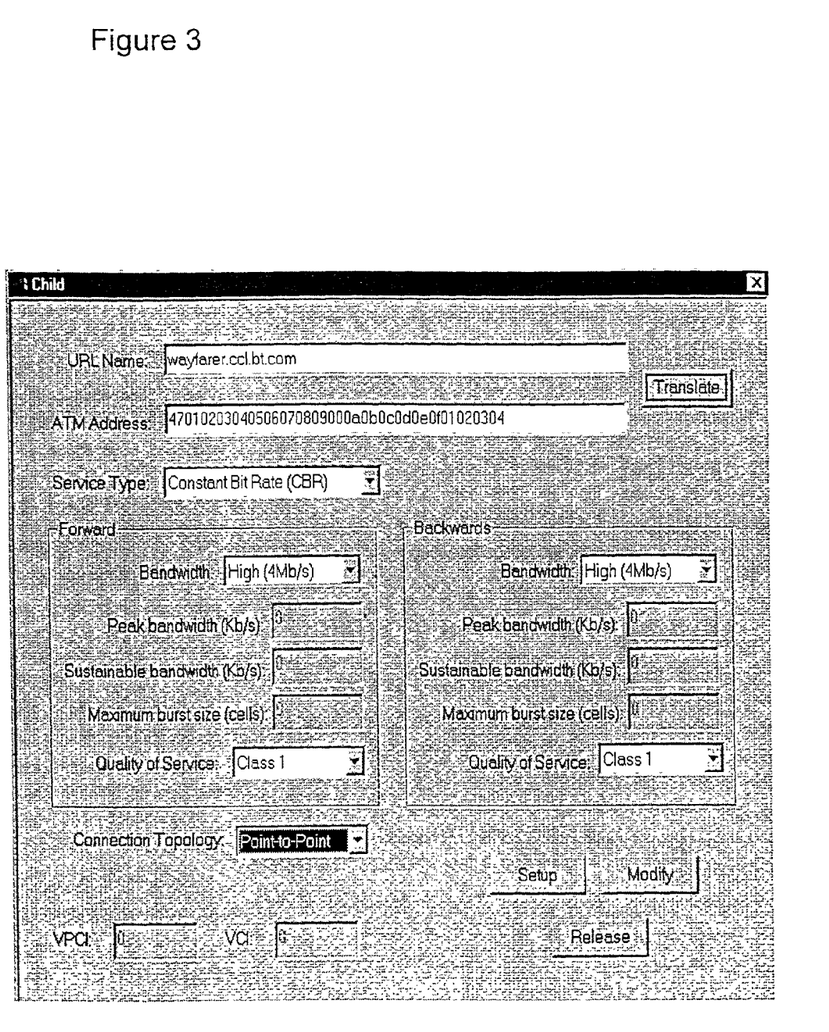
FIG. 3 shows a Graphic User Interface (GUI)

10. If the user wishes to terminate the file download, they can, by pressing the 'CANCEL' button on the progress dialog box or alternatively by pressing the 'STOP' button on the web browser GUI. This causes the state, ATM_ERROR to be entered, as shown in FIG. 4 and causes the ATM SVC to be released. In addition, providing there is end-to-end support between the web browser and the ATM server to support ITU-T Rec. Q.2963.1, or Q.2963.2 and (Q.2725.2 or Q2725.3) signalling, then the end user can modify the traffic characteristics of the ATM SVC. This modification process can be achieved via the use of the ATM GUI and the user entering new information or automatically by the application, which could be transparent to the user. FIG. 3 shows more information.

11. Once the file(s) have been downloaded to the web browser, the ATM server automatically starts the first step to close the ATM sockets. By closing the sockets causes the ATM server in turn, to release the ATM SVC between itself and the web browser. Any charging mechanisms associated with the SVC should be stopped. The web browser is now in the ATM_TRANSFER_STOP state, as shown in FIG. 4.

12. Once the ATM SVC has been released, the server and client can then completely shutdown their ATM sockets associated with the SVC and release any resource(s) allocated to them. The web browser is now in the FREE_ATM_RESOURCES state as shown in FIG. 4 and control is passed back to the calling process within the web browser.

The preferred embodiment of the invention described above offers a number of benefits. It enables the dynamic bandwidth and QoS characteristics associated with ATM technology to be exploited, and, importantly helps to hide the complexity of establishing ATM SVCs from the end user. Therefore the processes involved in establishing an ATM SVC, can become almost transparent to the user. It is believed that this transparency or ease of use, will help drive the deployment of ATM SVC capability to end users. Therefore an ATM based web browser could operate in the same manner as an IP Web Browser, such as Netscape Navigator and Microsoft Internet Explorer. The HTTP server storing the ATM URL of the file the user wishes to retrieve is better placed to understand the ATM characteristics required by the file, rather than the end user. The end user can have full control of when an ATM SVC is established and released, by using the ATM Graphical User Interface (GUI). The end user can also modify the ATM information in the URL, via the ATM GUI. As the ATM SVC is established from the user towards the server, it doesn't have any profound impacts on the traditional billing model. A high degree of independence from the underlying ATM signalling protocols is achieved. The ATM URL can be used with either ATM-F or ITU-T ATM UNI signalling protocols.

TABLE 2

| Order | Description | Length | Values |
|---|---|---|---|
| $1^{st}$ | UNI Protocol Version | 2 | UNIv3.0 = 1; UNIv3.1 = 2; UNIv4.0 = 3; UNIv4.1 = 4; Q.2931 = 5; UNIv3.1 or UNIv3.0 = 6; UNIv3.1 or UNIv4.0 = 7; UNIv3.1 or UNIv4.1 = 8; UNIv3.1 or Q.2931 = 9; UNIv4.0 or UNIv4.1 = 10; UNIv4.0 or Q.2931 = 11; UNIv4.1 or Q.2931 = 12; Other values are reserved for further use. |
| $2^{nd}$ | Connection Topology | 1 | User defined = 0; Point-to-point = 1; Point-to-multipoint = 2; Leaf Initiated Join = 3; Other values are reserved for further use. |
| $3^{rd}$ | LIJ Call Identifier | 1-10 | Range 0-4294967296 (i.e. 0-$2^{32}$). LIJ not Supported = x; |
| $4^{th}$ | AAL Type | 1 | AAL type1 = 1; AAL type2 = 2; AAL type3/4 = 3; AAL type5 = 5; Other values are reserved for further use. |
| $5^{th}$ | Bearer Capability | 1 | BCOB-A = 0 BCOB-C = 1; BCOB-X = 2; VP_service = 3; Other values are reserved for further use. |
| $6^{th}$ | Service Category | 1 | User defined = 0; CBR = 1; VBR = 2; VBR-rt = 3; UBR = 4; ABR = 5; ABT = 6; Other values are reserved for further use. |
| $7^{th}$ | Forward Bandwidth Value | 1 | User defined = 0; Server defined = 1. Other values are reserved for further use. |
| $8^{th}$ | Forward Peak Bandwidth (CLP = 0 + 1) | 1-7 | An integer value, expressed in Kbits/s, Range = 0-7113539. |
| $9^{th}$ | Forward Minimum Bandwidth | 1-7 | An integer value, expressed in Kbits/s, Range = 0-7113539. Not Applicable = x; |
| $10^{th}$ | Forward Sustainable Bandwidth (CLP = 0 + 1) | 1-7 | An integer value, expressed in Kbits/s, Range = 0-7113539. Not Applicable = x; |
| $11^{th}$ | Forward Sustainable Bandwidth (CLP = 0) | 1-7 | An integer value, expressed in Kbits/s, Range = 0-7113539. Not Applicable = x; |

TABLE 2-continued

| Order | Description | Length | Values |
|---|---|---|---|
| 12th | Forward Maximum Burst Size (CLP = 0 + 1) | 1-8 | An integer value, expressed in cells, Range = 0-16777216. Not Applicable = x; |
| 13th | Forward Maximum Burst Size (CLP = 0) | 1-8 | An integer value, expressed in cells, Range = 0-16777216. Not Applicable = x; |
| 14th | Backward Bandwidth Value | 1 | User defined = 0; Server defined = 1. Other values are reserved for further use. |
| 15th | Backward Peak Bandwidth (CLP = 0 + 1) | 1-7 | An integer value, expressed in Kbits/s, Range = 0-7113539. |
| 16th | Backward Minimum Bandwidth | 1-7 | An integer value, expressed in Kbits/s, Range = 0-7113539. Not Applicable = x; |
| 17th | Backward Sustainable Bandwidth (CLP = 0 + 1) | 1-7 | An integer value, expressed in Kbits/s, Range = 0-7113539. Not Applicable = x; |
| 18th | Backward Sustainable Bandwidth (CLP = 0) | 1-7 | An integer value, expressed in Kbits/s, Range = 0-7113539. Not Applicable = x; |
| 19th | Backward Maximum Burst Size (CLP = 0 + 1) | 1-8 | An integer value, expressed in cells, Range = 0-16777216. Not Applicable = x; |
| 20th | Backward Maximum Burst Size (CLP = 0) | 1-8 | An integer value, expressed in cells, Range = 0-16777216. Not Applicable = x; |
| 21st | Forward QoS | 1 | User defined = 0; Class1 = 1; Class2 = 2; Class3 = 3; Class4 = 4; Class Unspecified = 5; Individual QoS parameters = 6; Other values are reserved for further use. |
| 22nd | Backward QoS | 1 | User defined = 0; Class1 = 1; Class2 = 2; Class3 = 3; Class4 = 4; Class Unspecified = 5; Individual QoS parameters = 6; Other values are reserved for further use. |
| 23rd | Tagging | 1 | User defined = 0; Tag fwd cells = 1 Tag bwd cells = 2 Tag fwd + bwd cells = 3 Tagging Not Supported = x; Other values are reserved for further use. |
| 24th | Negotiation Type | 1 | User defined = 0; Alternative ATM traffic descriptor = 1; Min. Acceptable ATM traffic descriptor = 2; Negotiation Not Supported = x; Other values are reserved for further use. |
| 25th | Modification Supported | 1 | Modification supported = 1; Modification Not Supported = x; Other values are reserved for further use. |

GLOSSARY

ABR Available Bit Rate

ABT ATM Block Transfer

ARP Address Resolution Process

ATM Asynchronous Transfer Mode

ATM-F ATM Forum

B-HLI Broadband High Layer Information

B-LLI Broadband Low Layer Information

CBR Constant Bit Rate

DNS Domain Name Service

FR Frame Relay

GUI Graphical User Interface

HTML HyperText Marked-up Language

HTTP Hyper-Text Transfer Protocol

IE Information Element

IETF Internet Engineering Task Force

IP Internet Protocol

ITU-T International Telecommunications Union—Standardisation Sector

PVC Permanent Virtual Circuit

QoS Quality of Service

RFC Request For Comments

SPI Service Provider Interface

SVC Switched Virtual Circuit

TCP Transmission Control Protocol

UBR Unspecified Bit Rate

UDP User Datagram Protocol

UNI User Network Interface

URL Uniform Resource Locator

VBR Variable Bit Rate

VCI Virtual Channel Identifier

VPI Virtual Path Identifier

VPCI Virtual Path Connection Identifier

What is claimed is:

1. A method for operating a network circuit using a uniform resource locator (URL), the uniform resource locator comprising a circuit-switched identifier part identifying a resource as being accessible via a circuit-switched network, an address part comprising the address of the resource, and a service parameter part, wherein it is the circuit-switched identifier part which identifies the specific type of circuit switched network via which the resource is accessible, the service parameter part determines parameters of a connection in the specific type of circuit switched network identified by the circuit-switched identifier part to the resource, and the uniform resource locator has the format:

<circuit-switched identifier part>://<service parameter part>*<address part> where * is a predetermined separator character.

2. A method as in claim 1 in which the identifier part identifies the resource as being accessible via an ATM network.

3. A method as in claim 2 in which the service parameter part includes ATM service parameters.

4. A method as in claim 1 in which the service parameter part includes an identifier for a connection topology.

5. A method as in claim 1 in which the service parameter part includes a parameter indicating a connection bandwidth.

6. A computer for use in a communications network including a circuit-switched network, the computer including a store programmed with machine executable instructions and a URL for operating a network circuit using the URL, the URL comprising a circuit-switched identifier part identifying a resource as being accessible via the circuit-switched network, an address part comprising the address of the resource, and a service parameter part, wherein it is the circuit-switched identifier part which identifies the specific type of circuit switched network via which the resource is accessible, the service parameter part determines parameters of a connection in the specific type of circuit switched network identified by the circuit-switched identifier part to the resource, and the uniform resource locator has the format:

<circuit-switched identifier part>://<service parameter part>*<address part> where * is a predetermined separator character.

7. A computer for use in a communications network including a circuit-switched network, the computer including a store programmed with a Uniform Resource Locator product with a uniform resource locator (URL), the uniform resource locator comprising a circuit-switched identifier part identifying a resource as being accessible via the circuit-switched network, an address part comprising the address of the resource, and a service parameter part, wherein it is the circuit-switched identifier part which identifies the specific type of circuit switched network via which the resource is accessible, the service parameter part determines parameters of a connection in the specific type of circuit switched network identified by the circuit-switched identifier part to the resource, and the uniform resource locator has the format:

<circuit-switched identifier part>://<service parameter part>*<address part> where * is a predetermined separator character.

8. A computer according to claim 7, in which the identifier part identifies the resource as being accessible via an ATM network.

9. A computer according to claim 8, in which the service parameter part includes ATM service parameters.

10. A computer according to claim 7, in which the service parameter part includes an identifier for a connection topology.

11. A computer according to claim 7, in which the service parameter part includes a parameter indicating a connection bandwidth.

12. A computer for use in a communications network including a circuit-switched network, the computer including a store programmed with machine executable instructions and a Uniform Resource Locator product with a Uniform Resource Locator (URL) comprising a circuit-switched identifier part identifying a resource as being accessible via the circuit-switched network, an address part comprising the address of the resource, and a service parameter part, wherein it is the circuit-switched identifier part which identifies the specific type of circuit switched network via which the resource is accessible, the service parameter part determines parameters of a connection in the specific type of circuit switched network identified by the circuit-switched identifier part to the resource, and the uniform resource locator has the format:

<circuit-switched identifier part>://<service parameter part>*<address part> where * is a predetermined separator character.

13. A method of operating a terminal connected directly or indirectly to a circuit-switched network, the method comprising:

a) reading a uniform resource locator (URL), the URL comprising a circuit-switched identifier part identifying a resource as being accessible via a circuit-switched network, an address part comprising the address of the resource, and a service parameter part, wherein it is the circuit-switched identifier part which identifies the specific type of circuit switched network via which the resource is accessible and the uniform resource locator has the format: <circuit-switched identifier part>://<service parameter part>*<address part> where * is a predetermined separator character; and     b) subsequently establishing a connection, in the specific type of circuit switched network identified by the circuit-switched identifier part, between the customer terminal and the resource, the connection having properties determined at least in part by one or more parameters contained in the service parameter part.

14. A method according to claim 13, including reading the uniform resource locator from a server remote from the terminal.

15. A method according to claim 13, in which step (b) is initiated by the terminal.

16. A method according to claim 13 in which the identifier part identifies the resource as being accessible via an ATM network, and the service parameter part contains one or more ATM service parameters.

17. A terminal for use in a communications network including a circuit-switched network, the terminal comprising:

a) a network interface for connection to the communications network; and     b) a processor arranged to carry out the following steps:

i) reading a uniform resource locator (URL), the URL comprising a circuit-switched identifier part identifying a resource as being available via the circuit-switched network, an address part comprising the address of the resource, and a service parameter part, wherein it is the circuit-switched identifier part which identifies the specific type of circuit switched network via which the resource is accessible and the uniform resource locator has the format: <circuit-switched identifier part>://<service parameter part>*<address part> where * is a predetermined separator character; and     (ii) subsequently establishing a connection, in the specific type of circuit switched network identified by the circuit-switched identifier part, between the customer terminal and the resource, the connection having properties determined at least in part by one or more parameters contained in the service parameter part.

18. A terminal according to claim 17 in which the identifier part identifies the resource as being accessible via an ATM network, and the service parameter part contains one or more ATM service parameters.

19. A data server for use in a communications network including a circuit-switched network, the data server including a store programmed with a Uniform Resource Locator product with a uniform resource locator (URL), the uniform resource locator comprising a circuit-switched identifier part identifying a resource as being accessible via the circuit-switched network, an address part comprising the address of the resource, and a service parameter part, wherein it is the circuit-switched identifier part which identifies the specific type of circuit switched network via which the resource is accessible, the service parameter part determines parameters of a connection in the specific type of circuit switched network identified by the circuit-switched identifier part to the resource, and the uniform resource locator has the format:

<circuit-switched identifier part>://<service parameter part>*<address part> where * is a predetermined separator character.

20. A non-transitory machine readable media tangibly carrying machine executable instructions and a Uniform Resource Locator product with a Uniform Resource Locator (URL) comprising a circuit-switched identifier part identifying a resource as being accessible via a circuit-switched network, an address part comprising the address of the resource, and a service parameter part, wherein it is the circuit-switched identifier part which identifies the specific type of circuit switched network via which the resource is accessible, the service parameter part determines parameters of a connection in the specific type of circuit switched network identified by the circuit-switched identifier part to the resource, and the uniform resource locator has the format:

<circuit-switched identifier part>://<service parameter part>*<address part> where * is a predetermined separator character.

\* \* \* \* \*